S. A. CRONE.
RAILWAY BRAKE BEAM.
APPLICATION FILED APR. 29, 1910.
981,620.
Patented Jan. 17, 1911.
5 SHEETS—SHEET 2.
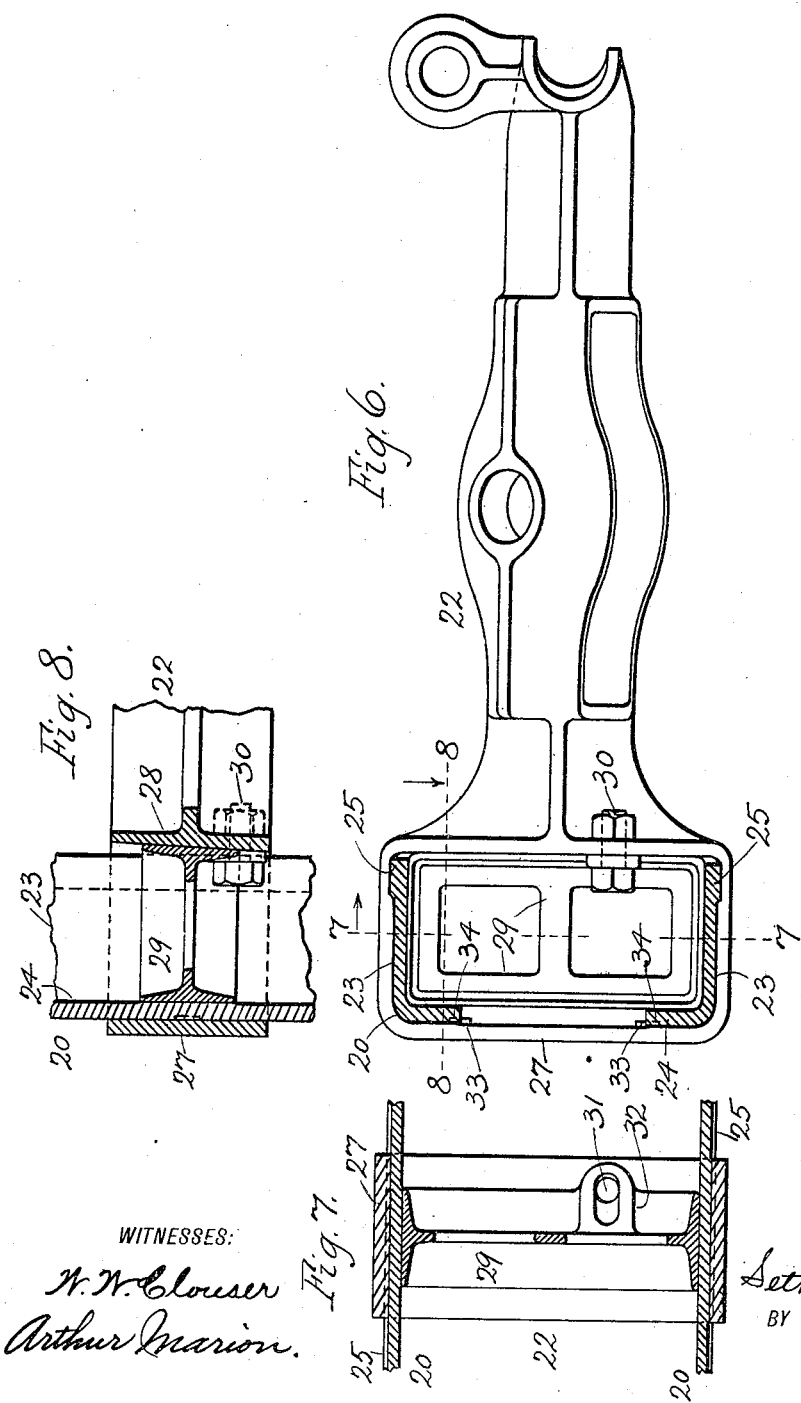

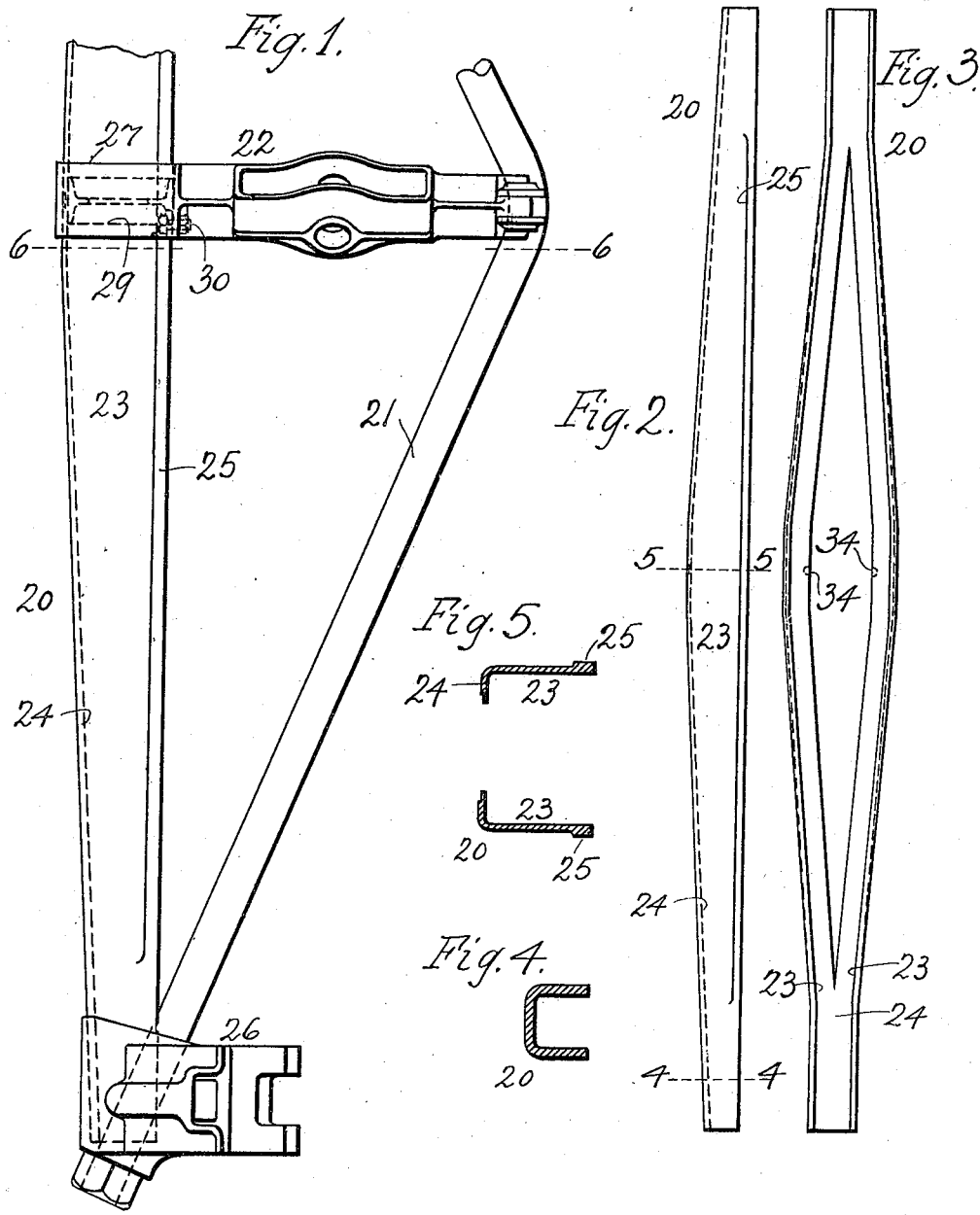

S. A. CRONE.
RAILWAY BRAKE BEAM.
APPLICATION FILED APR. 29, 1910.
981,620.
Patented Jan. 17, 1911.
5 SHEETS—SHEET 3.
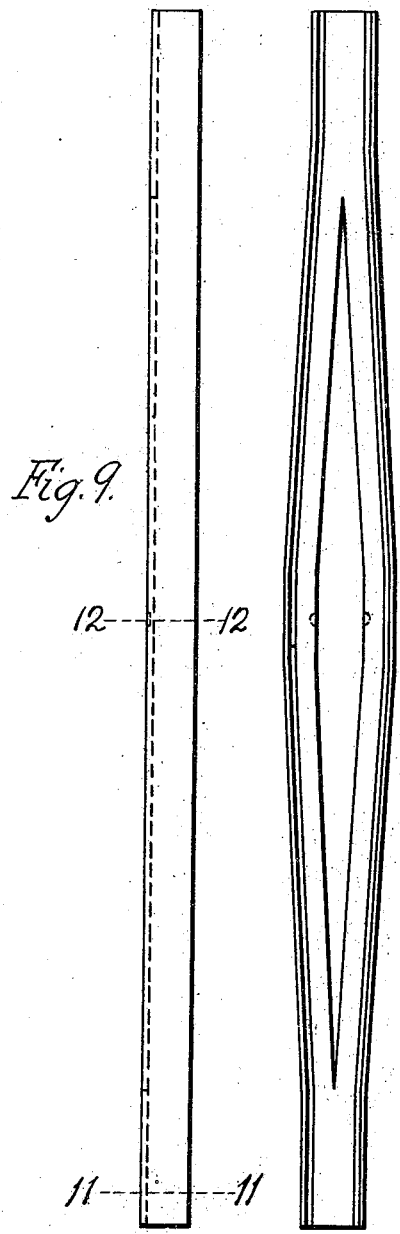
Fig. 9.
Fig. 10.
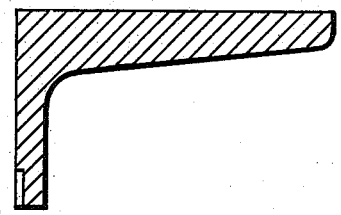
Fig. 12.
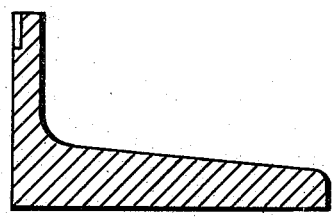
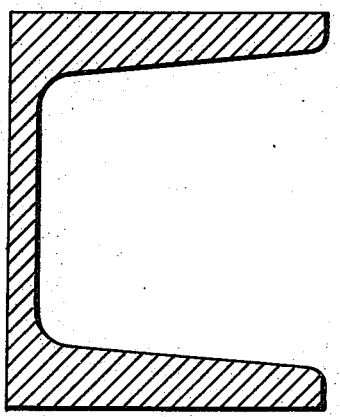
Fig. 11.
WITNESSES:
W. W. Clouser
Arthur Marion
INVENTOR
Seth A. Crone,
BY
Chas. C. Gill
ATTORNEY S. A. CRONE.
RAILWAY BRAKE BEAM.
APPLICATION FILED APR. 29, 1910.
981,620.
Patented Jan. 17, 1911.
5 SHEETS—SHEET 4.
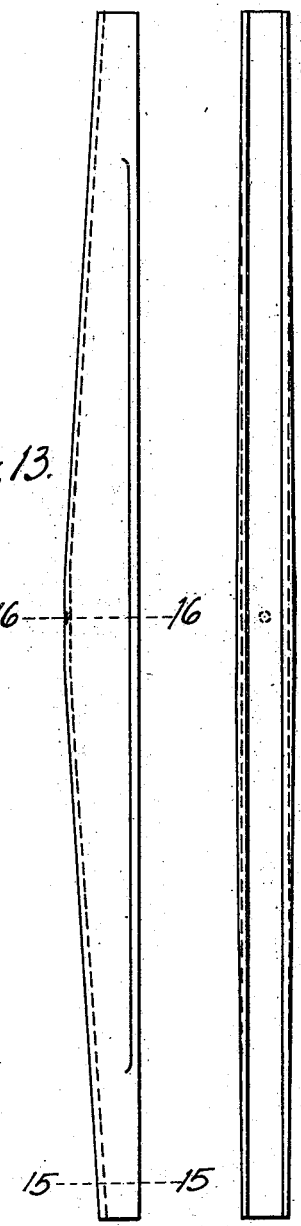
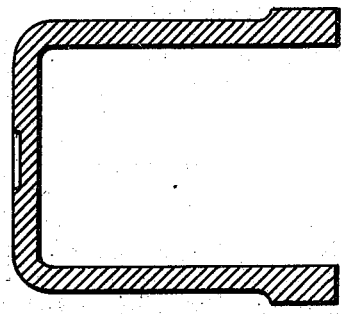
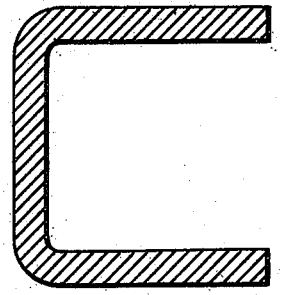
WITNESSES:
INVENTOR
Seth A. Crone
BY
Chas. C. Gill
ATTORNEY S. A. CRONE.
RAILWAY BRAKE BEAM.
APPLICATION FILED APR. 29, 1910.
981,620.
Patented Jan. 17, 1911.
5 SHEETS—SHEET 5.
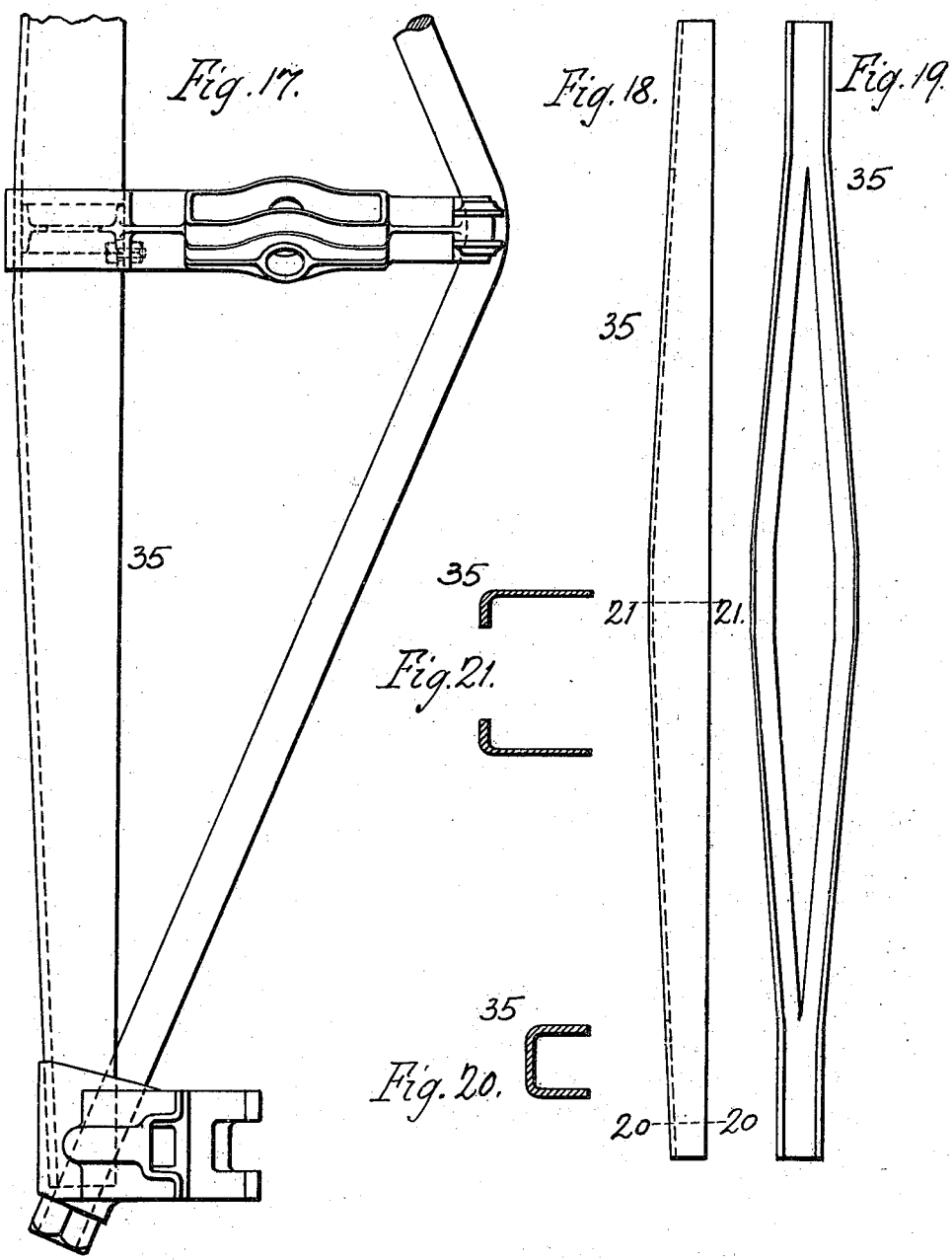
WITNESSES:
INVENTOR
Seth A. Crone,
BY
ATTORNEY

UNITED STATES PATENT OFFICE.

SETH A. CRONE, OF EAST ORANGE, NEW JERSEY.

RAILWAY BRAKE-BEAM.

981,620.  Specification of Letters Patent.  Patented Jan. 17, 1911.

Application filed April 29, 1910.  Serial No. 558,397.

*To all whom it may concern:*

Be it known that I, SETH A. CRONE, a citizen of the United States, and a resident of East Orange, in the county of Essex and State of New Jersey, have invented certain new and useful Improvements in Railway Brake-Beams, of which the following is a specification.

The invention relates to improvements in railway brake-beams, and it consists in the novel features and structure hereinafter described and particularly pointed out in the claims.

My invention pertains more especially to truss-beams and resides in a novel construction of the compression and strut members of the beam.

One object of the invention is to produce a generally channel compression member of novel construction rendering it of increased efficiency in resisting the strains to which such member is subjected in practical use.

The novel features of the strut pertain more particularly to those portions thereof in engagement with the compression member and whereby the strut and compression member become secured together.

The preferred channel compression member embodying my invention will preferably be pressed up from a plate into its channel shape and given such special form and construction as to enable it to efficiently resist both direct strains and vertical strains, but a portion of my invention may be realized in the use of an ordinary channel section reconstructed to receive the strut and more effectively resist vertical strains.

The invention will be fully understood from the detailed description hereinafter presented, reference being had to the accompanying drawings, in which:

Figure 1 is a top view of a portion of a brake-beam embodying my invention; Fig. 2 is a detached top view, on a reduced scale, of the entire compression member of the beam; Fig. 3 is a front elevation of the same; Fig. 4 is a vertical section on a somewhat enlarged scale through an end portion of the same on the dotted line 4—4 of Fig. 2; Fig. 5 is a corresponding section through the middle portion of the compression member on the dotted line 5—5 of Fig. 2; Fig. 6 is an enlarged vertical section through the beam on the dotted line 6—6 of Fig. 1, the truss-rod being omitted; Fig. 7 is a vertical longitudinal section through a portion of the same on the dotted line 7—7 of Fig. 6; Fig. 8 is a vertical transverse section through a portion of the same on the dotted line 8—8 of Fig. 6; Fig. 9 is a top view of a compression member embodying a portion of my invention made from a usual form of rolled channel section; Fig. 10 is a side view of the same; Fig. 11 is an enlarged vertical section through an end portion of the same on the dotted line 11—11 of Fig. 9; Fig. 12 is a corresponding section through the middle portion of the same on the dotted line 12—12 of Fig. 9; Fig. 13 is a detached top view of a compression member embodying all the features of my invention except that which pertains to affording increased capability of resisting vertical strains; Fig. 14 is a side elevation of the same; Fig. 15 is an enlarged vertical section through an end portion of the same on the dotted line 15—15 of Fig. 13; Fig. 16 is a corresponding section through the middle portion of the same on the dotted line 16—16 of Fig. 13; Fig. 17 is a top view of a portion of a brake-beam embodying a modified form of my invention; Fig. 18 is a detached top view of the compression member thereof; Fig. 19 is an inner face view of the same; Fig. 20 is a section of the same on the dotted line 20—20 of Fig. 18, and Fig. 21 is a section of the same on the dotted line 21—21 of Fig. 18.

In the drawings, referring to Figs. 1 to 8 inclusive, 20 designates the compression member, 21 the truss-rod, and 22 the strut, the truss-rod at its middle portion engaging the strut and at its ends being secured at the ends of the compression member and retaining the brake-heads thereon, as usual. The compression member 20 is of special construction as to its capability of resisting direct strains and also vertical strains, and said member 20 is of generally channel cross-section and preferably pressed and drawn up from a flat rolled plate to form the upper and lower corresponding sides 23 and vertical back 24 connecting said sides. The compression member 20 in its preferred construction embraces two main characterizing features, one being that said member is split through a portion of its back 24 and spread open vertically (Figs. 3 and 5) to create a truss effect and enable the member to more effectually resist vertical strains, and the other being that in the formation of the channel the member is given a straight front edge and a rear edge which inclines or tapers frontwardly from the middle of the back toward the ends of the beam, as shown in Figs. 1 and 2. I preferably construct the member 20 from a plate having parallel side edges and by means of dies force the plate into channel shape with the channel deepest at its center and thence tapering, at the back of the beam, toward the ends thereof, the metal at the ends of the beam being in consequence somewhat thicker than at the middle portions of the same, as indicated in Figs. 4 and 5. In accordance with my method of construction the compression member without increasing the weight thereof beyond what would be required for a straight channel beam, is increased in horizontal width between its end portions and in efficiency to resist direct strains, and is also increased in height at its middle portions and in capability to resist vertical strains. The split through the back 24 of the channel and the spreading of the beam vertically, upwardly and downwardly along said split, results in the beam being widest at its vertical central parts and thence converging at its upper and lower sides toward the ends of the beam (Fig. 3), said split and spreading not extending through the ends of the beam but being confined to the intermediate or middle portions thereof. A further feature of my compression member is that in the pressing up of the same I preferably retain the initial metal in the edges of the plate for a certain distance between the ends of the same so as to create reinforces or ribs 25 along the front edges of the beam, said ribs not extending to the ends of the beam where the metal is not materially thinned by the dies, but along those portions of the beam which have been subjected to the greatest pressure in giving the beam its increased horizontal width.

I do not limit my invention to all of the features of the compression member I have hereinbefore described, but regard all of said features as desirable in the attainment of the best results.

The truss-rod 21 and brake-heads 26 are of usual character. The strut 22 is also of usual character except at its outer end where it is engaged with the compression member, and at said end the strut is formed with an open box or yoke 27 to be slipped over the end of the compression member and snugly engage the middle portion thereof. Within the channel-chamber of the compression member and to engage the inclined inner side 28 of the box or loop 27, I force a filling-block 29 which serves not only to strengthen the middle portion of the beam, but as a wedge to bind the strut and compression member in rigid relation to each other, and I secure said block by means of a bolt 30 which passes through a hole 31 in the strut and an elongated slot in a lug 32 on said block, said slot permitting of the adjustment of the block within the head of the strut. As means for further securing the strut and compression member together, I preferably form small ribs or studs 33 on the inner side of the outer end of the strut (Fig. 6) to enter depressions or recesses 34 in the compression member when said strut is in proper position, said studs and depressions serving to lock the strut and compression member against shifting action one on the other.

Figs. 1 to 8 inclusive present the preferred embodiment of all portions of my invention, but I do not limit myself to all the features and details shown in Figs. 1 to 8 inclusive since some of them may be omitted and others modified without departing from the spirit of my invention. For illustration, in Figs. 9, 10, 11, 12, I show the compression member as made from a rolled channel section split through its back and having its upper and lower sides spread apart, as in the construction indicated in Figs. 1 to 8, thereby without increasing the weight of the beam, securing the added capability of resistance to vertical strains, which is one of the highly desirable features of my invention. The strut shown in Figs. 1 and 6 may be used with the compression member shown in Figs. 9, 10, 11, 12.

In Figs. 13, 14, 15, 16 I show a pressed-up compression member corresponding exactly with the compression member of Figs. 1 to 8 inclusive except that it is not split in its back and its upper and lower sides are not spread apart vertically to attain the increased resistance to vertical strains which such construction affords.

In Figs. 17, 18, 19, 20, 21, I show a compression member 35 corresponding substantially with the compression member of Figs. 1 to 8 inclusive except that it lacks the reinforces or ribs 25 illustrated in Fig. 1.

The channel is initially straight at its front edge but in use it may be cambered to some extent due to the pull on the ends of the member.

I do not limit my invention to splitting the back of the channel since the upper and lower sides thereof may be spread or spaced from each other by stretching the metal in the back, extra metal being provided for this stretching, if required.

What I claim as my invention and desire to secure by Letters Patent, is:

1. A brake-beam comprising a compression-member, a strut and a truss-rod, said compression-member being of channel formation and split through the middle portions of its back, with the upper and lower sides of the beam along the split spaced apart; substantially as set forth.

2. A brake-beam comprising a compression-member, a strut and a truss-rod, said compression-member being of channel formation and having a straight front edge and a rear edge or back which inclines frontwardly from its center toward the ends of the beam, the upper and lower sides of the compression member having integral ribs extending along their front edges; substantially as set forth.

3. A brake-beam comprising a channel compression-member, a strut and a truss-rod, said compression member gradually decreasing in horizontal width from its center toward its ends and being split through the middle portions of its back, with the upper and lower sides of the beam along the split spaced apart; substantially as set forth.

4. A brake-beam comprising a channel compression member, a strut and a truss-rod, said compression-member having a straight front edge and a rear edge or back which inclines frontwardly from its center toward the ends of the beam, and the back of the compression member being split through its middle portions, with the upper and lower sides of the beam along the split spaced apart; substantially as set forth.

5. A brake-beam comprising a channel compression-member, a truss-rod and a strut, said strut having on its outer end a yoke encompassing said channel and inclined on its side facing the open side of the channel, combined with a filling block within the channel and engaging said inclined surface, and a bolt securing the filling block and strut together, one of said parts having a slot and the other a hole for the bolt; substantially as set forth.

6. A brake-beam comprising a compression-member, a truss-rod and a strut on whose outer end is a yoke encompassing said compression-member, said yoke and said member respectively having a lug and a recess to interlock and hold the parts in due relation to each other; substantially as set forth.

Signed at New York city, in the county of New York and State of New York, this 27th day of April A. D. 1910.

SETH A. CRONE.

Witnesses:
ARTHUR MARION,
CHAS. C. GILL.